(12) United States Patent
Sloan et al.

(10) Patent No.: US 7,382,369 B2
(45) Date of Patent: Jun. 3, 2008

(54) SYSTEMS AND METHODS FOR ROBUST SAMPLING FOR REAL-TIME RELIGHTING OF OBJECTS IN NATURAL LIGHTING ENVIRONMENTS

(75) Inventors: Peter-Pike Johannes Sloan, Bellevue, WA (US); Yi-Ren Ng, Mountain View, CA (US); John Michael Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 10/815,141

(22) Filed: Mar. 31, 2004

(65) Prior Publication Data

US 2005/0078116 A1   Apr. 14, 2005

Related U.S. Application Data

(60) Provisional application No. 60/510,301, filed on Oct. 10, 2003.

(51) Int. Cl.
   *G06T 15/00* (2006.01)
(52) U.S. Cl. .................. 345/423; 345/419; 345/582
(58) Field of Classification Search ........ 345/418–419, 345/423, 582, 585–586
   See application file for complete search history.

(56) References Cited

U.S. PATENT DOCUMENTS 5,142,617 A * 8/1992 Dalrymple et al. ......... 345/606

OTHER PUBLICATIONS

Baum et al., Making Radiosity Usable: Automatical Preprocessing and Messing Techniques for the Generation of Accurate Radiosity Solutions, ACM Computer Graphics, Jul. 1991, pp. 51-60.*

Kautz, J. et al., "Fast, Arbitrary BRDF Shading for Low-Frequency Lighting Using Spherical Harmonics", *13 th Eurographics Workshop on Rendering*, 2002, 28, 291-296, 335, XP 002377563.

Krivanek, J. et al., "Adaptive Mesh Subdivision for Precomputed Radiance Transfer", *Proceedings of the 20th Conference on Computer Graphics*, 2004, 106-111, XP-002377559.

Lehtinen, J. et al., "Matrix Radiance Transfer", *Proceedings of the 2003 Symposium on Interactive 3d Graphics*, 2003, 59-64, 237, XP 002377562.

Sloan, P.P. et al., "Bi-Scale Radiance Transfer", *ACM Transactions on Graphics*, 2003, 22(3), 370-375, XP-002377558.

Sloan, P.P. et al., "Precomputed Radiance Transfer for Real-Time Rendering in Dynamic, Low-Frequency Lighting Environments", *Proceedings of the 29th Annual Conference on Computer Graphics and Interactive Techniques*, 2002, 21(3), 527-536, XP-002377560.

Sloan, P.P. et al., "Clustered Principal Components for Precomputed Radiance Transfer", *ACM Transactions on Graphics*, 2003, 22(2), 382-391, XP002377561.

* cited by examiner

*Primary Examiner*—Phu K. Nguyen
(74) *Attorney, Agent, or Firm*—Woodcock Washburn LLP

(57) ABSTRACT

The present invention is directed to a enhanced Precomputed Radiance Transfer (PRT) system employing an algorithm to compute a PRT signal over a surface mesh and subdividing facets of the mesh to increase the number of surface vertices such that the spatial variation of the transfer signal is resolved sufficiently everywhere on the surface. The method of this system ensures that radiance transfer shading produces colors of sufficient accuracy all over the surface. In certain embodiments, transfer is computed only at surface vertices, although this does result in a certain amount of acceptable aliasing and blurring of surface lighting detail in regions where the tessellation is too coarse. Furthermore, the method comprises a spatial and density sampling techniques that measures the transfer signal to a desirable appropriate resolution while minimizing aliasing. Once computed, the signal is represented as compactly as possible to minimize storage and runtime computation requirements.

25 Claims, 7 Drawing Sheets

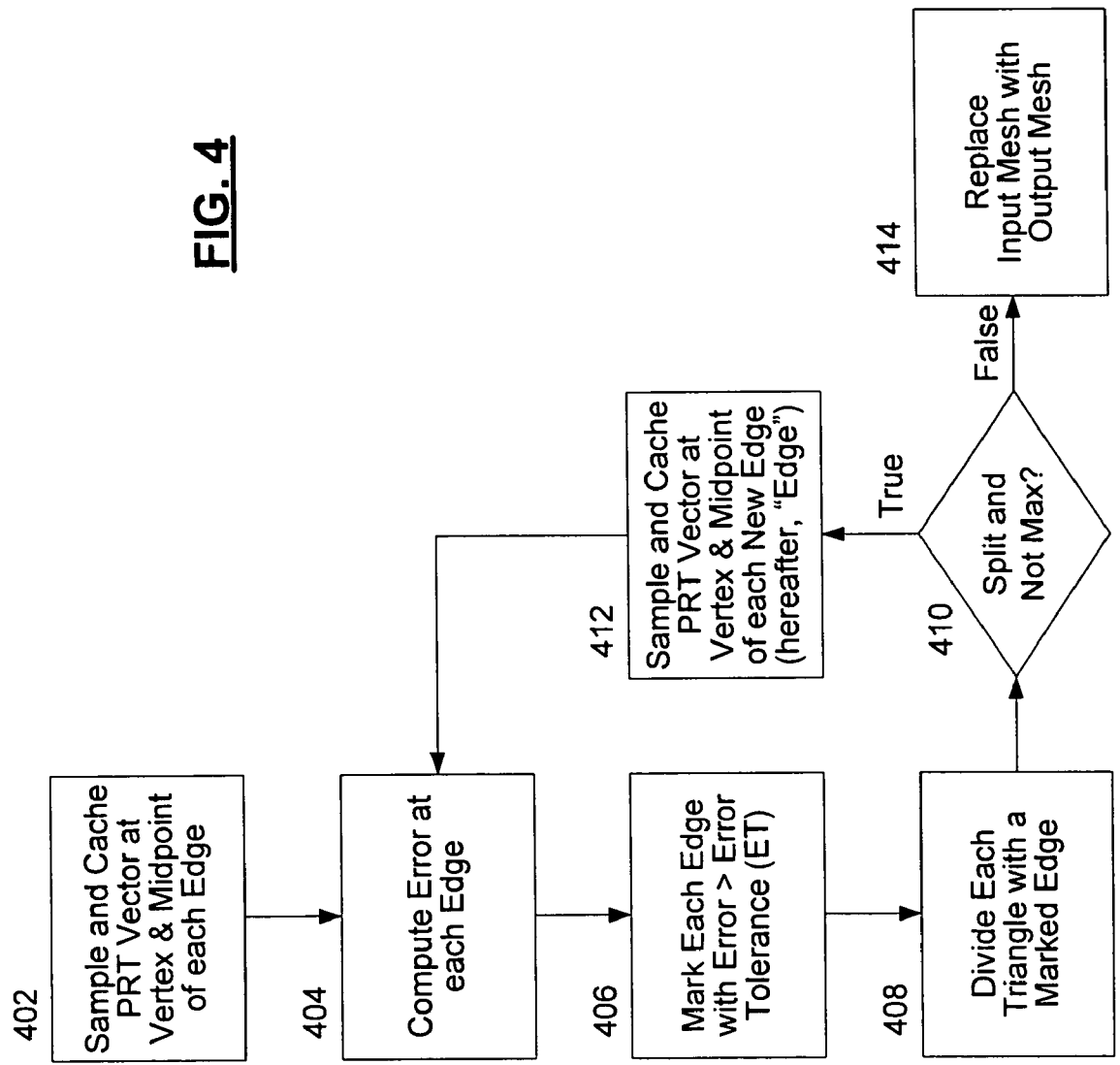

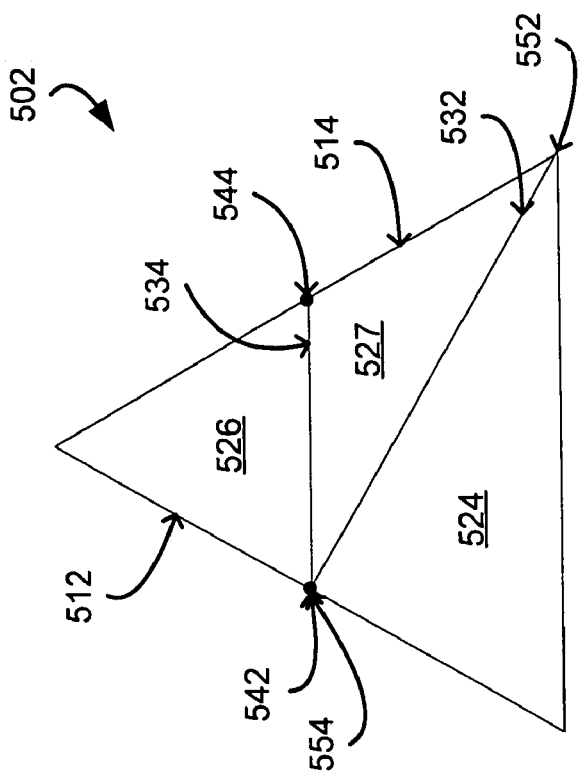
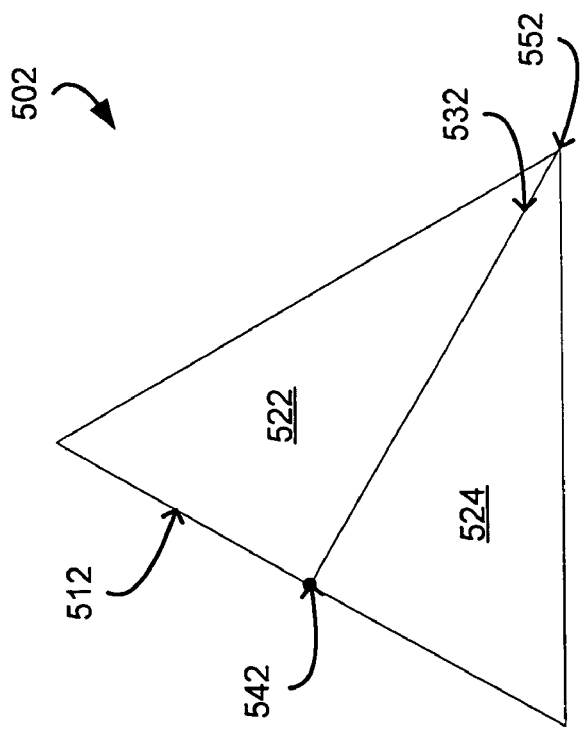
FIG. 5B
FIG. 5A

SYSTEMS AND METHODS FOR ROBUST SAMPLING FOR REAL-TIME RELIGHTING OF OBJECTS IN NATURAL LIGHTING ENVIRONMENTS

CROSS-REFERENCES

This application claims benefit of U.S. Provisional Patent Application No. 60/510,301, filed on Oct. 10, 2003, entitled "ROBUST SAMPLING FOR PRT," the contents of which are hereby incorporated herein by reference in their entirety.

This application is related by subject matter to the inventions disclosed in the following commonly assigned applications, the entire contents of which are hereby incorporated herein by reference: U.S. patent application No. 10/815,140, filed on even date herewith, entitled "SYSTEMS AND METHODS FOR ALL-FREQUENCY RELIGHTING USING SPHERICAL HARMONICS AND POINT LIGHT DISTRIBUTIONS."

TECHNICAL FIELD

The present invention relates generally to the field of computer graphics, and more particularly to real-time relighting of computer-generated three-dimensional graphics objects existing in natural lighting environments.

BACKGROUND

In regard to computer-generated three-dimensional graphics objects existing in natural lighting environments, properly representing lighting from area sources, soft shadows, and interreflections are important effects in realistic image synthesis. Unfortunately, general methods in the art for integrating over large-scale lighting environments, including Monte Carlo ray tracing, radiosity, and multi-pass rendering that sums over multiple point light sources, are all impractical for real-time rendering. Real-time, realistic global illumination encounters three difficulties: (a) it must model the complex, spatially-varying Bidirectional Reflectance Distribution Functions (BRDFs) of real materials (that is, the BRDF complexity); (b) it requires integration over the hemisphere of lighting directions at each point (light integration); and (c) it must account for bouncing/occlusion effects, like shadows, due to intervening matter along light paths from sources to receivers (light transport complexity). As known and appreciated by those of skill in the art, existing developments in the art have largely focused on extending BRDF complexity (e.g., glossy and anisotropic reflections) and solving the light integration problem by representing incident lighting as a sum of directions or points. Light integration thus tractably reduces to sampling an analytic or tabulated BRDF at a few points, but becomes intractable for large light sources. Other existing methods samples radiance and preconvolves it with kernels of various sizes to solves the light integration problem, but these methods ignore light transport complexities like shadows since the convolution assumes the incident radiance is unoccluded and unscattered. Finally, a handful of additional methods exist to simulate more complex light transport, especially shadows, but light integration is as problem and these techniques are impractical for very large light sources.

An improved method that has recently emerged for solving many of these problems in preexisting methods is Precomputed Radiance Transfer (PRT), which is a method for real-time rendering of diffuse and glossy objects in low-frequency lighting environments that captures soft shadows, interreflections, and caustics. As a preprocess, a global transport simulator creates functions over the object's surface representing transfer of arbitrary, low-frequency incident lighting into transferred radiance which includes global effects like shadows and interreflections from the object onto itself. At run-time, these transfer functions are applied to actual incident lighting. Dynamic, local lighting is handled by sampling it close to the object every frame, and the object can also be rigidly rotated with respect to the lighting (and vice versa). Lighting and transfer functions are represented using low-order spherical harmonics, which avoids aliasing, and evaluates efficiently on graphics hardware by reducing the shading integral to a dot product of, say, nine (9) to twenty-five (25) element vectors for diffuse receivers. Glossy objects are handled using matrices rather than vectors. The method also implements functions for radiance transfer from a dynamic lighting environment through a preprocessed object to neighboring points in space. These allow soft shadows and caustics from rigidly moving objects to be cast onto arbitrary, dynamic receivers in order to provide real-time global lighting effects.

PRT better accounts for light integration and light transport complexity in real-time, particularly in low frequency lighting environments by using this low-order, spherical harmonic (SH) basis to represent environments efficiently. The foundational approach of the PRT method is to represent how an object scatters this light onto itself or its neighboring space. In general, the technique of the PRT method assumes initially to have a convex, diffuse object lit by an infinitely distant environment map. The object's shaded "response" to its environment can be viewed as a transfer function, mapping incoming to outgoing radiance, which in this case simply performs a cosine-weighted integral. A more complex integral captures how a concave object shadows itself, where the integrand is multiplied by an additional transport factor representing visibility along each direction. The PRT approach is to precompute for a given object the expensive transport simulation required by complex transfer functions like shadowing. The resulting transfer functions are represented as a dense set of vectors or matrices over its surface. Meanwhile, incident radiance need not be precomputed as the graphics hardware can dynamically sample incident radiance at a number of points—analytic models, such as skylight models or simple geometries like circles, can also be used. By representing both incident radiance and transfer functions in a linear basis (in this case, SH), the method exploit the linearity of light transport to reduce the light integral to a simple dot product between their coefficient vectors (diffuse receivers) or a simple linear transform of the lighting coefficient vector through a small transfer matrix (glossy receivers). Low-frequency lighting environments require few coefficients—again, ranging from nine (9) to twenty-five (25) coefficients—to enable graphics hardware to compute the result in a single pass. Thus, unlike the Monte-Carlo ray tracing technique and multi-pass light integration methods, the run-time computation of the PRT method stays constant no matter how many or how big the light sources may be, and in fact the method actually benefits from large-scale, smooth lighting to limit the number of SH coefficients necessary.

The PRT method represents complex transport effects like interreflections and caustics in the transfer function. Since these are simulated as a preprocess, only the transfer function's basis coefficients are affected, not the run-time computation. This approach handles both surface and volume-based geometry. In addition to transfer from a rigid object to itself, called self-transfer, the technique can be generalized to neighborhood-transfer from a rigid object to its neighboring space, allowing cast soft shadows, glossy reflections, and caustics on dynamic receivers.

As a preprocess, a global illumination simulator is run over the model that captures how it shadows and scatters light onto itself. The result is recorded as a dense set of vectors (diffuse case) or matrices (glossy case) over the model. At run-time, incident radiance is first projected to the SH basis. The model's field of transfer vectors or matrices is then applied to the lighting's coefficient vector. If the object is diffuse, a transfer vector at each point on the object is dotted with the lighting's coefficients to produce correctly self-scattered shading. If the object is glossy, a transfer matrix is applied to the lighting coefficients to produce the coefficients of a spherical function representing self-scattered incident radiance at each point. This function is convolved with the object's BRDF and then evaluated at the view-dependent reflection direction to produce the final shading.

To supplement this brief description of the PRT approach, more information on PRT can be found in "Precomputed Radiance Transfer for Real-Time Rendering in Dynamic, Low-Frequency Lighting Environments" by Peter-Pike Sloan, Jan Kautz, and John Snyder (SIGGRAPH, July 2002), a copy of which is included as Appendix A hereto and the entirety of which is hereby incorporated herein by reference.

Despite the benefits of the existing PRT method, however, convex unshadowed regions will exhibit less spatial variation—and hence require fewer samples—than areas near blockers casting sharp shadows, and heretofore PRT has not accounted for the benefits of spatial sampling density. Also, while a true transfer may have very high frequency content—such as a sharp visibility horizon caused by blockers, or a bright point caused by caustic focusing effects—there is typically greater interest in the lowest frequency components of the signal. What is needed in the art is an enhanced PRT method that better accounts for both spatial and density characteristics.

SUMMARY

The present invention overcomes the shortcomings and deficiencies of the prior art by providing a system and method for providing a robust sampling approach for the Precomputed Radiance Transfer methodology. In one embodiment, the present invention comprises a sampling technique over a 3-dimensional (3D) surface that measures the transfer signal to an appropriate resolution while minimizing aliasing. Once computed, the signal is represented as compactly as possible to minimize storage and runtime computation requirements.

Various embodiments of the present invention are directed to PRT system, that is, a computer system that utilizes an algorithm to compute a PRT signal over a surface mesh, subdividing facets of the mesh to increase the number of surface vertices such that the spatial variation of the transfer signal is resolved sufficiently everywhere on the surface. This method ensures that radiance transfer shading produces colors of sufficient accuracy all over the surface. In certain embodiments, transfer is computed only at surface vertices, although this does result in a certain amount of acceptable aliasing and blurring of surface lighting detail in regions where the tessellation is too coarse.

Certain embodiments of the present invention are directed to a system and method for enhancing a Precomputed Radiance Transfer (PRT) mesh comprising a tessellation of triangles, said triangles comprising vertices and edges by (a) sampling a PRT vector at each vertex and each midpoint of each edge, and computing an error at each midpoint at each edge based on the PRT vector for each said midpoint and the PRT vectors for each vertex corresponding to each said edge; and (b) for each edge having an error at its midpoint that is greater than a predetermined error tolerance value (e.g., when the difference between PRT at the midpoint and some model for PRT over the edge is computed based on PRT at endpoints, where such differences between PRT at midpoint and average of PRT between two endpoints (linear interpolation to midpoint) comprises an error value), dividing the triangle for that edge into two new triangles as follows: (i) dividing the marked edge into two new edges with a new vertex at the midpoint for said edge (each a "divided edge"); and (ii) creating a new edge between said new vertex and a vertex not on said edge, such that said edge is common to said two new triangles (each a "common edge"). In alternative embodiments, for each new edge, including divided edges and common edges, additional steps for recursively performing the following steps for each such new edge created (herein below, each an "edge") is also disclosed: (1) sampling a PRT vector each midpoint of each edge, and computing an error at each midpoint at each edge based on the PRT vector for each said midpoint and the PRT vectors for each vertex corresponding to each said edge; and (2) for each edge having an error at its midpoint that is greater than the predetermined error tolerance value, dividing the triangle for that edge into two new triangles as previously discussed. These steps are then recursively performed until either no new edges are created in preceding recursive iteration, or until a predetermined number of recursions have been performed.

For certain additional embodiments, an alternative approach is employed where, for each triangle comprising at least one edge having an error at its midpoint that is greater than a predetermined error tolerance value (a "marked edge"), dividing said triangle into four new triangles as follows: dividing each edge of said triangle into two new edges with a new vertex at the midpoint for said such edge (each a "divided edge"); and creating new edges between each pair of new vertices (each a "common edge").

These and other embodiments are described in greater detail herein.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 is a flowchart illustrating one embodiment of a method comprising various aspects of the invention;

FIGS. 5A, 5B, and 5C are block diagrams illustrating the division of a triangle into two, three, or four new triangles respectively, all in accordance with one embodiment of the present invention as described in FIG. 4;

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
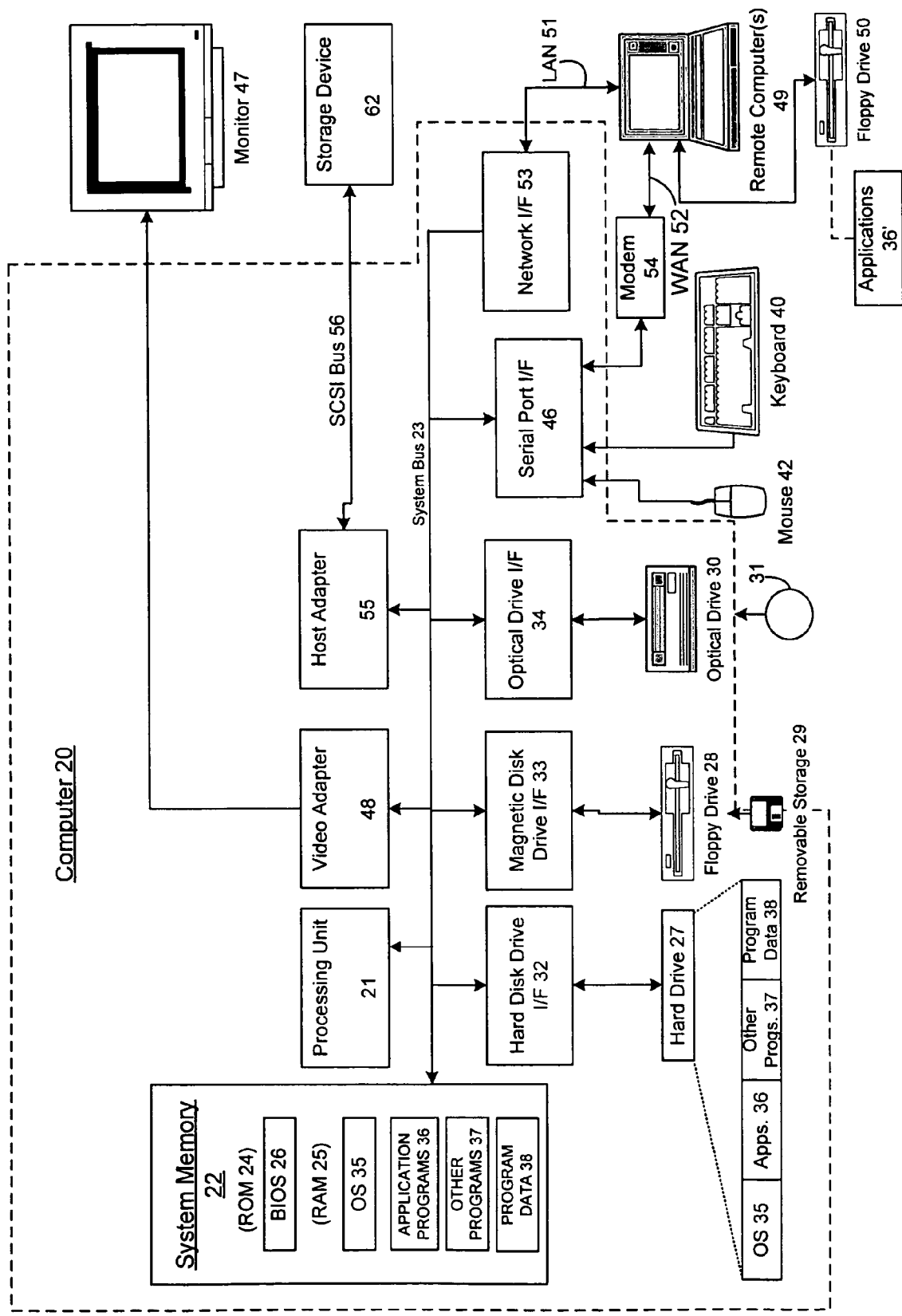
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Graphics Processing Subsystems

Figure 2:
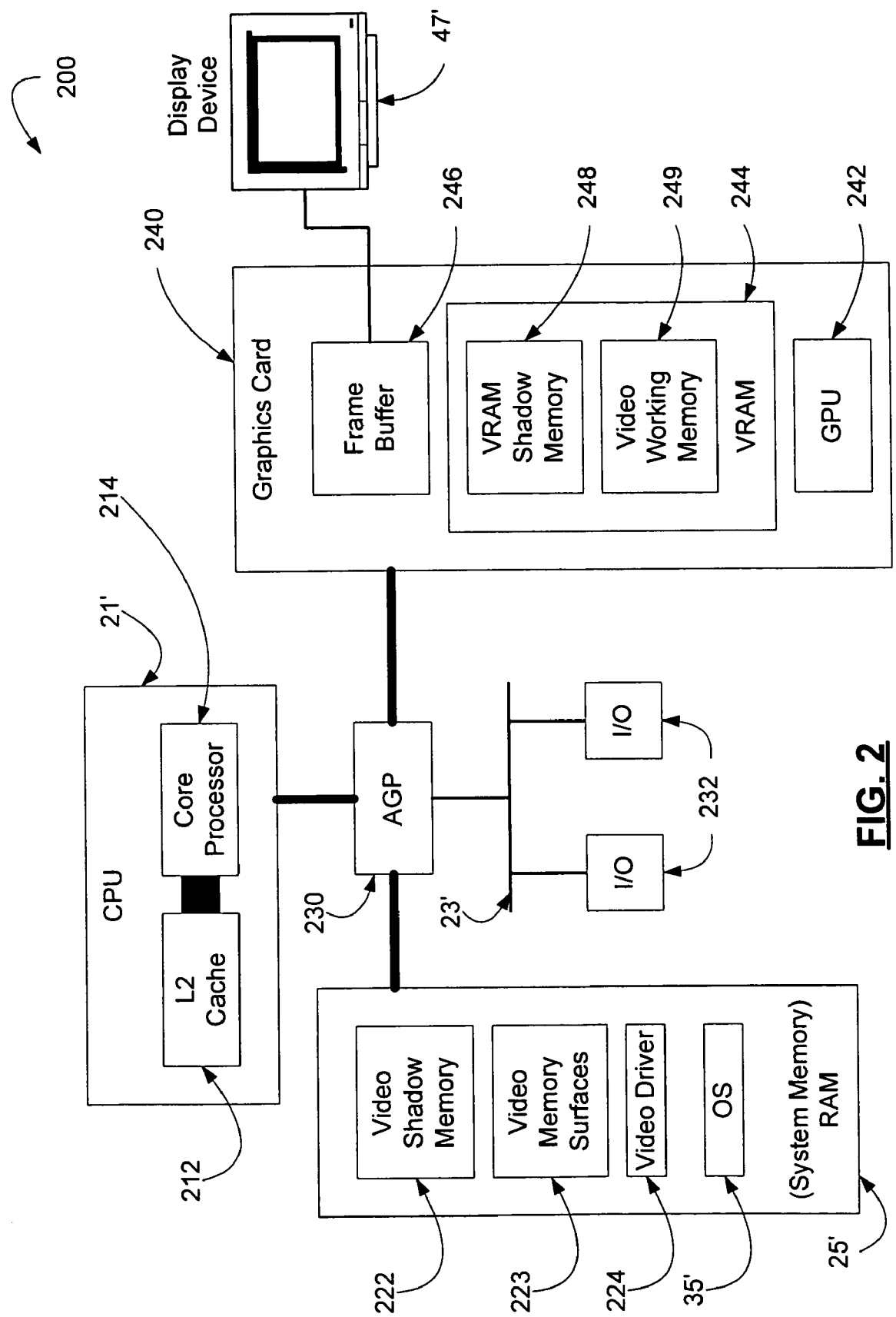
FIG. 2 is a block diagram illustrating a typical computer graphics subsystem.

FIG. 2 is a block diagram illustrating a typical computer graphics subsystem 200. The subsystem 200 comprises a CPU 21' that, in turn, comprises a core processor 214 having an on-chip L1 cache (not shown) and is further directly connected to an L2 cache 212. The L1 cache (not shown) of the CPU '21 is usually built onto the microprocessor chip itself, e.g., the Intel MMX microprocessor comes with a 32 KB L1 cache. The L2 cache 212, on the other hand, is usually on a separate chip (or possibly on an expansion card) but can still be accessed more quickly than RAM, and is usually larger than the L1 cache, e.g., one megabyte is a common size for a L2 cache. As well-known and appreciated by those of skill in the art, the CPU 21' accessing data and instructions in cache memory is much more efficient than having to access data and instructions in random access memory (RAM 25, referring to FIG. 1), and thus the CPU can achieve significant performance gains that a GPU, which lacks a cache.

The CPU 21' is connected to an AGP 230. The AGP provides a point-to-point connection between the CPU 21', the system memory RAM 25', and graphics card 240, and further connects these three components to other input/output (I/O) devices 232—such as a hard disk drive 32, magnetic disk drive 34, network 53, and/or peripheral devices illustrated in FIG. 1—via a traditional system bus such as a PCI bus 23'. The presence of AGP also denotes that the computer system favors a system-to-video flow of data traffic—that is, that more traffic will flow from the CPU 21' and its system memory RAM 25' to the graphics card 240 than vice versa—because AGP is typically designed to up to four times as much data to flow to the graphics card 240 than back from the graphics card 240.

The graphics card 240 further comprises a frame buffer 246 which is directly connected to the display device 47'. As well-known and appreciated by those of skill in the art, the frame buffer is typically dual-ported memory that allows a processor (the GPU. 242 or the CPU '21, as the case may be) to write a new (or revised) image to the frame buffer while the display device 47' is simultaneously reading from the frame buffer to refresh (or "update") the current display content. The graphics card 240 further comprises a GPU 242 and VRAM 244.

The GPU 242 is essentially a second processing unit in the computer system that has been specifically optimized for graphics operations. Depending on the graphics card, the GPU 242 may be either a graphics coprocessor or a graphics accelerator. When the graphics card is a graphics coprocessor, the video driver 224 sends graphics-related tasks directly to the graphics coprocessor for execution, and the graphics coprocessor alone render graphics for the frame buffer 246 (without direct involvement of the CPU 21'). On the other hand, when a graphics cards is a graphics accelerator, the video driver 224 sends graphics-related tasks to the CPU 21' and the CPU 21' then directs the graphics accelerator to perform specific graphics-intensive tasks. For example, the CPU 21' might direct the graphics accelerator to draw a polygon with defined vertices, and the graphics accelerator would then execute the tasks of writing the pixels of the polygon into video memory (the VRAMSM 248) and, from there, copy the updated graphic to the frame buffer 246 for display on the display device 47'.

Accompanying the GPU 242 is VRAM 244 that enables the GPU to maintain its own shadow memory (the VRAMSM) close at hand for speedy memory calls (instead of using RAM), and may also provide additional memory (e.g, VWM) necessary for the additional processing operations such as the GPU Method. The VRAM 244 further comprises a VRAMSM 248 and VWM 249. The VRAMSM 248 is the location in VRAM 244 where the GPU 242 constructs and revises graphic images (including CIs in the GPU Method), and it is the location from which the GPU 242 copies rendered graphic images to the frame buffer 246 of the graphics card 240 to update the display device 47'. In the GPU Method, the VWM is an additional area of VRAM that is used by the GPU 242 to temporarily store graphics data that might be used by the GPU 242 to store GOs and/or store/restore POs (or portions thereof) among other things. (By offloading this functionality to the graphics card 240, the CPU 21' and VSM 222 are freed from these tasks.)

The system memory RAM 25' may comprise the operating system 35', a video driver 224, video memory surfaces (VMSs) 223, and video shadow memory (VSM) 222. The VSM is the location in RAM 25' where the CPU 21' constructs and revises graphic images (including CIs in the CPU Method) and from where the CPU 21' copies rendered graphic images to the frame buffer 246 of the graphics card 240 via the AGP 230. In the CPU Method, the VMSs are additional areas of RAM that are used by the CPU 21' to temporarily store graphics data that might be used by the CPU 21' to store GOs and/or store/restore POs (or portions thereof) among other things.

Spatially-Discrete Adaptive Sampling Algorithm

Various embodiments of the present invention are directed to PRT system, that is, a computer system that utilizes an algorithm to compute a PRT signal over a surface mesh, subdividing facets of the mesh to increase the number of surface vertices such that the spatial variation of the transfer signal is resolved sufficiently everywhere on the surface. This method ensures that radiance transfer shading produces colors of sufficient accuracy all over the surface. In certain embodiments, transfer is computed only at surface vertices, although this does result in a certain amount of acceptable aliasing and blurring of surface lighting detail in regions where the tessellation is too coarse.

Figure 3:
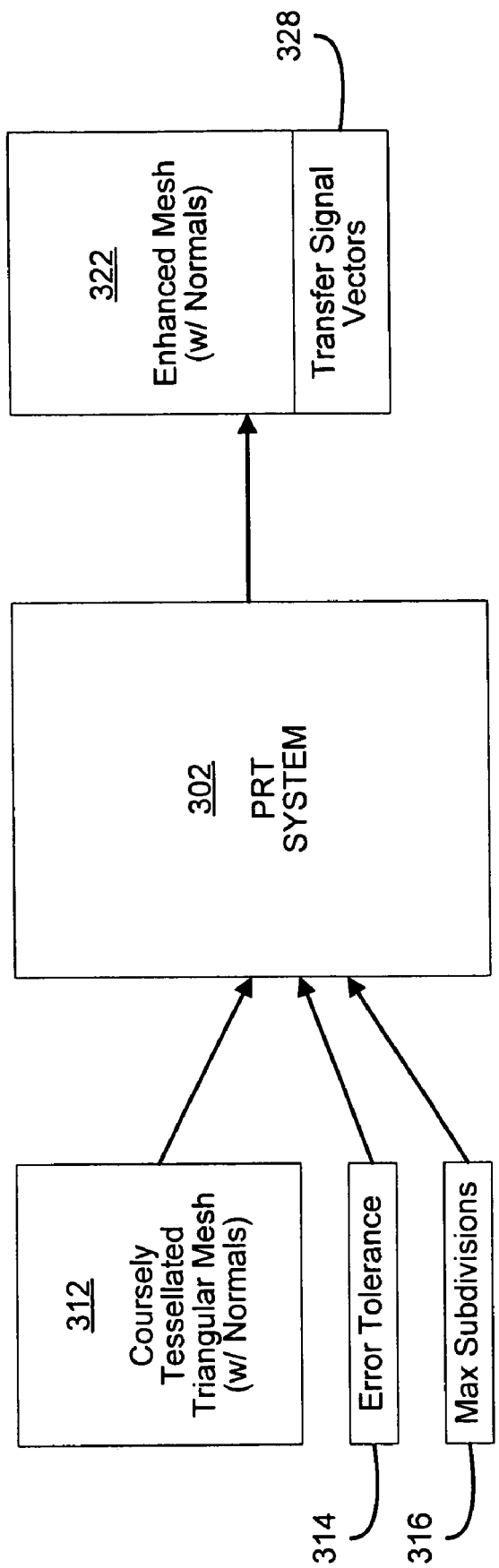
FIG. 3 is a block diagram illustrating the inputs and outputs for several embodiments of the present invention.

FIG. 3 is a block diagram illustrating the inputs and outputs for several embodiments of the present invention. In the figure, the PRT system 302 receives input comprising a coarsely tessellated triangle mesh (with normals) 312, a value corresponding to an error tolerance 314 (discussed in detail later herein), and a value corresponding to a maximum number of subdivision levels 316. Using these inputs, the PRT system then produces: (i) a new, enhanced mesh ("EM") 322 that is geometrically similar to the input mesh but where certain facets have been subdivided more finely; and (ii) a transfer signal vector at each vertex of the enhanced mesh (together the "TSVs") 328.

FIG. 4 is a flowchart illustrating one embodiment of a method comprising various aspects of the invention. In summary, to convert the inputs to the outputs, the PRT system employs an algorithm that samples the PRT vector at a vertex of the mesh using, for example, a software raytracer such as that found in the back-end to the current DirectX 9.1 D3DXSBPRTSimulation function (although it should be noted that this functionality is not currently exposed in the DirectX API). Such a ray-tracer may use, for example, Hammersley points or even a Halton sequence of ray directions distributed about the hemisphere about each point, where the probability distribution of the samples might be cosine weighted to importance-sample the diffuse cosine falloff, and where a static distribution might be used and rotated into the local frame of each vertex.

As illustrated in the figure, and for several embodiments of the present invention, the algorithm employed by the PRT system comprises a plurality of steps. At step 402, the system initially samples and caches the PRT vector at each vertex and the midpoint of each edge of the tessellation (that is, for every original triangle in the mesh). At step 404, the system then computes an error at each edge, which may be simply the squared error between the sampled vector and the vector that results from linear interpolation of the vectors at each endpoint of the edge. At step 406, for each edge the system determines if the error is greater than the supplied threshold and, if so, marks each such edge as one to subdivide. At step 408, and for each triangle in the tessellation (comprising three edges and three vertices), the system then subdivides said triangles into 2, 3, or 4 triangles if 1, 2, or 3 of its edges are marked, where the PRT vector at each new vertex is given the value that was computed at the midpoint of the edge before the subdivision. At step 410, if any triangles were split into new triangles at step 408, and if the maximum number of subdivisions has not yet been reached, then at step 412 (and in subsequent iterations) the system samples and caches the PRT vector at each vertex and the midpoint of each edge of the new triangles created in the most recent operation of step 408 and then returns to step 404 to continue further processing of those edges. This cycle continues until, at step 410, either no triangles were subdivided in most recent iteration of step 408 or the maximum number of subdivisions has been reached, at which point, and at step 414, the subdivision process is terminated and the system replaces the input mesh with the output mesh, the latter of which will thereafter provide the current list of vertices and triangles, and where the PRT signals are the cached PRT vectors at each vertex.

Figure 5C:
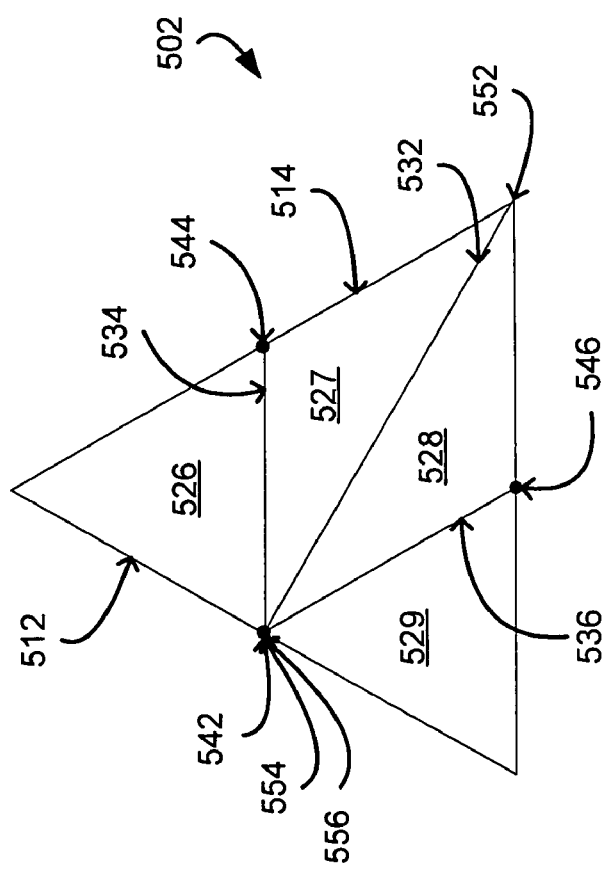

FIGS. 5A, 5B, and 5C are block diagrams illustrating the division of a triangle into two, three, or four new triangles respectively, all in accordance with one embodiment of the present invention as described in step 408 of FIG. 4. In FIG. 5A, a triangle 502 having a single marked edge 512 is divided into two new triangles 522 and 524 when a new edge 532 is extended from the midpoint 542 of the marked edge 512 to the vertex 552 opposite said marked edge 512.

In FIG. 5B, the same triangle 502 having two marked edges 512 and 514, employs essentially the same approach as illustrated in FIG. 5A but in two parts, the first part a subdivision made for edge 512 as shown in FIG. 5A, and the second part a subdivision made for edge 514, where the subdivision for the second edge 514 is made within the new triangle 522 that results from the subdivision in the first part made for edge 512. More specifically, for a triangle 502 having two marked edges 512 and 514: (a) the triangle 502 is first divided into two new triangles 522 and 524 when a new edge 532 is extended from the midpoint 542 of the marked edge 512 to the vertex 552 opposite said marked edge 512; and (b) the new triangle 522 is further divided into two new triangles 526 and 527 when a new edge 534 is extended from the midpoint 544 of the marked edge 514 to the vertex 554 opposite said marked edge 514 (where said vertex 554 also happens to be the midpoint for edge 512).

In FIG. 5C, the same triangle 502 now having three marked edges 512, 514, and 516, also employs essentially the same approach as illustrated in FIGS. 5A and 5B but in three parts, the first part a subdivision made for edge 512 as shown in FIG. 5A, the second part a subdivision made for edge 514 as shown in FIG. 5B, and a third part a subdivision made for edge 516, where the subdivision for the third edge 516 is made within the new triangle 524 that resulted from the subdivision in the first part made for edge 512. More specifically, for a triangle 502 having three marked edges 512, 514, and 516: (a) the triangle 502 is first divided into two new triangles 522 and 524 when a new edge 532 is extended from the midpoint 542 of the marked edge 512 to the vertex 552 opposite said marked edge 512; (b) the new triangle 522 is further divided into two new triangles 526 and 527 when a new edge 534 is extended from the midpoint 544 of the marked edge 514 to the vertex 554 opposite said marked edge 514 (where said vertex 554 also happens to be the midpoint for edge 512); and (c) the new triangle 524 is further divided into two new triangles 528 and 529 when a new edge 536 is extended from the midpoint 546 of the marked edge 514 to the vertex 556 opposite said marked edge 514 (where said vertex 556 also happens to be the midpoint for edge 512 and the vertex opposite edge 514 in triangle 522).

Referring again to FIG. 4, and in regard to step 408, it is important to note that the sum of the new triangles created (e.g., triangles 526, 527, 528, and 529 of FIG. 5C) still span exactly the same space as the original triangle (502). In addition, it is also presumed that the algorithm interpolates normal vectors from the endpoints to the new vertices such that the normal variation may be better resolved in the new, enhanced mesh.

Figure 6:
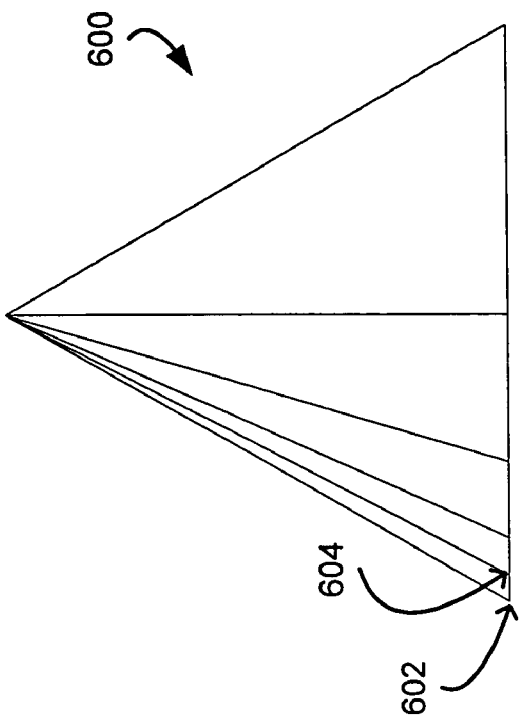
FIG. 6 is a block diagram illustrating a narrow-triangle result stemming from four iterations of the method of FIG. 4 which may result when, for example, the transition between specific points define a sharp image boundary in the graphic being represented.
Figure 7A:
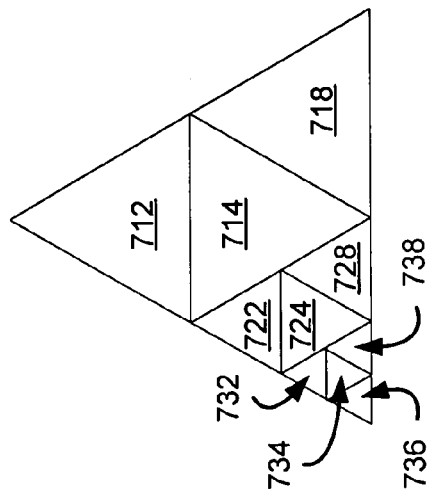
FIGS. 7A, 7B, 7C, 7D, and 7E are block diagrams illustrating the resulting triangle from three iterations of the alternative 4-triangle subdivision method.
Figure 7B:
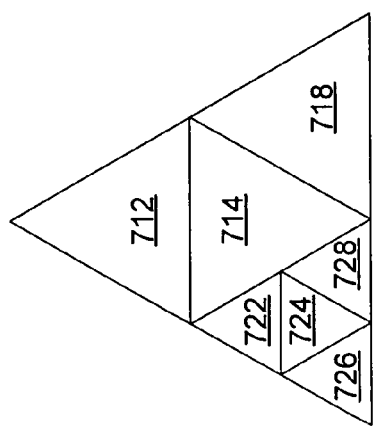
Figure 7C:
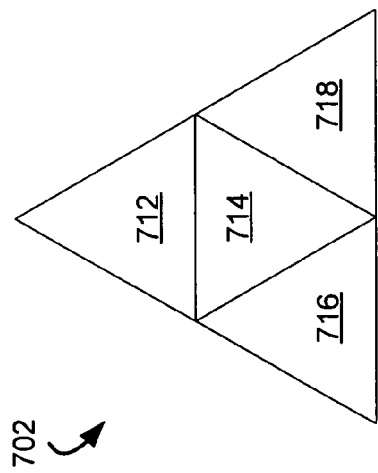

In certain alternative embodiments to the method illustrated in FIG. 4, and specifically in regard to step 408, instead of subdividing a triangle into 2, 3, or 4 triangle if 1, 2, or 3 of the edges are marked, the PRT system may instead subdivide any triangle with even a single marked edge into four triangles based on the midpoints of each edge of the original triangle. This approach avoids a "narrow-triangle" result that may otherwise result in the method illustrated in FIG. 4 at step 408 where, iteratively, the algorithm divides the same edge of the original triangle repeatedly. FIG. 6 is a block diagram illustrating a narrow-triangle result stemming from four iterations of the method of FIG. 4 which may result when, for example, the transition between points 602 and 604 define a sharp image boundary in the graphic being represented. FIGS. 7A, 7B, and 7C, on the other hand, are block diagrams illustrating the resulting triangle from three iterations of the alternative 4-triangle subdivision method wherein, it should be noted, each resulting triangle is a smaller but nearly identical version of the larger triangle. In FIG. 7A, the original triangle 702 is divided into four triangles 712, 714, 716, and 718. In FIG. 7B, the resulting triangle 716 (not labeled) is again divided into four triangles 722, 724, 726, and 728. In FIG. 7C, the resulting triangle 726 (not labeled) is again divided into four triangles 732, 734, 736, and 738.

Figure 7D:
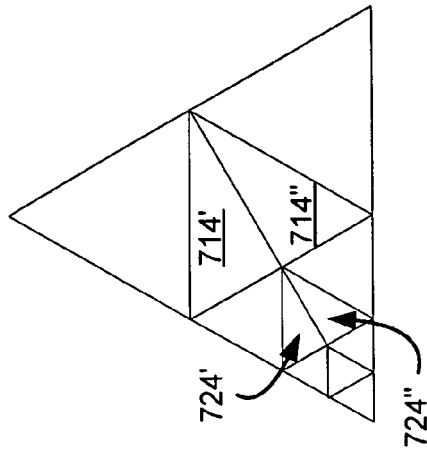
Figure 7E:
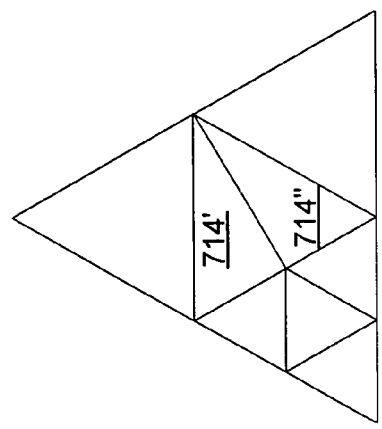

Moreover, for several of these embodiments, and in particular regard to the four-triangle subdivision method illustrated in FIGS. 7A, 7B, and 7C, it should be noted that, in order to avoid T-vertices, additional edges, generally known as "conformal edges," are necessarily included as part of the subdivision process as needed to eliminate T-vertices. In FIG. 7B, this results in triangle 714 being divided into two triangles, 714' and 714" as shown in FIG. 7D; and in FIG. 7C this results in triangle 724 being divided into two triangles 724' and 724" as shown in FIG. 7E. In both cased, these conformal divisions occur due to the corresponding 4-to-1 subdivision that occurs in an adjacent triangle. This same process may also be necessary, and for certain embodiments also occurs automatically, for triangles that are divided into two, three, or four triangles as illustrated in FIGS. 5A, 5B, and 5C.

Regardless of the approach used, however, these diverse embodiments of the present invention employ methods of subdivision that have an inherent advantage in that, after a round of edge marking and subdivision, the mesh is always well formed in the sense that it does not have any T-cracks, and thus this approach is simpler than more sophisticated schemes that may require fix-up passes or require more elaborate splitting rules.

One error metric employed by various embodiments of the present invention is the squared error of the PRT signal integrated over the edge; this involves the length of the edge, and thus error decreases at higher levels of subdivision. An alternative error metric used by certain alternative embodiments of the present invention eliminates the integration and simply measures the absolute error difference at the very midpoint of each edge that is tested which, in turn, may be roughly interpreted as estimating the $L^\infty$ norm through discrete sampling of maximum error over the surface.

Overall, this enhanced PRT approach is simple and the underlying algorithm provides valid meshes at every step of the subdivision. Moreover, the final values of the transfer signal are trivial to export since these are the data computed and cached in estimating error across edges.

Conclusion

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A method for enhancing a Precomputed Radiance Transfer (PRT) mesh comprising a tessellation of triangles, said triangles comprising vertices and edges, said method comprising:

dividing at least one triangle in the mesh, but not all triangles in the mesh, into at least two or more triangles apiece, wherein said dividing at least one triangle comprises dividing at least one edge and creating at least one new vertex and at least one new edge running from said vertex for said triangle;

sampling a PRT vector at each vertex and each midpoint of each edge, and computing an error at each midpoint at each edge based on the PRT vector for each said midpoint and the PRT vectors for each vertex corresponding to each said edge; and for each edge having an error at its midpoint that is greater than a predetermined error tolerance value (a "marked edge"), dividing the triangle for that edge into at least two new triangles as follows:

dividing the marked edge into two new edges with a new vertex at the midpoint for said edge (each a "divided edge"); and creating a new edge between said new vertex and a vertex not on said edge, such that said edge is common to said two new triangles (each a "common edge").

2. The method of claim 1 further comprising, for each new edge, including divided edges and common edges, recursively performing the following steps for each such new edge created (herein below, each an "edge"):

sampling a PRT vector each midpoint of each edge, and computing an error at each midpoint at each edge based on the PRT vector for each said midpoint and the PRT vectors for each vertex corresponding to each said edge; and for each edge having an error at its midpoint that is greater than the predetermined error tolerance value (a "marked edge"), dividing the triangle for that edge into at least two new triangles as follows:

dividing the marked edge into two new edges with a new vertex at the midpoint for said edge (each a "divided edge"); and creating a new edge between said new vertex and a vertex not on said edge, such that said edge is common to said two new triangles (each a "common edge");

said step recursively performed until either (a) no new edges are created in preceding recursive iteration or (b) a predetermined number of recursions have been performed.

3. The method of claim 2 wherein a triangle, consisting of one edge having an error at its midpoint that is greater than the predetermined error tolerance value, is divided into at least two new triangles.

4. The method of claim 2 wherein a triangle, consisting of two edges having errors at the midpoints thereof greater than the predetermined error tolerance value, is divided into three new triangles.

5. The method of claim 2 wherein a triangle, consisting of three edges having errors at the midpoints thereof greater than the predetermined error tolerance value, is divided into four new triangles.

6. A method for enhancing a Precomputed Radiance Transfer (PRT) mesh comprising a tessellation of triangles, said triangles comprising vertices and edges, said method comprising:

dividing at least one triangle in the mesh, but not all triangles in the mesh, into at least two or more triangles apiece, wherein said dividing at least one triangle comprises dividing at least one edge and creating at least one new vertex and at least one new edge running from said vertex for said triangle;

sampling a PRT vector at each vertex and each midpoint of each edge, and computing an error at each midpoint at each edge based on the PRT vector for each said midpoint and the PRT vectors for each vertex corresponding to each said edge; and for each triangle comprising at least one edge having an error at its midpoint that is greater than a predetermined error tolerance value (a "marked edge"), dividing said triangle into four new triangles as follows:

dividing each edge of said triangle into two new edges with a new vertex at the midpoint for said such edge (each a "divided edge"); and creating new edges between each pair of new vertices (each a "common edge").

7. The method of claim 6 further comprising, for each new edge, including divided edges and common edges, recursively performing the following steps for each such new edge created (herein below, each an "edge"):

sampling a PRT vector at each edge, and computing an error at each midpoint at each edge based on the PRT vector for each said midpoint and the PRT vectors for each vertex corresponding to each said edge; and for each triangle comprising at least one edge having an error at its midpoint that is greater than a predetermined error tolerance value, dividing said triangle into four new triangles as follows:

dividing each edge into two new edges with a new vertex at the midpoint for said such edge; and creating new edges between each pairs of new vertices;

said steps recursively performed until either (a) no new edges are created in preceding recursive iteration or (b) a predetermined number of recursions have been performed.

8. A system for enhancing a Precomputed Radiance Transfer (PRT) mesh comprising a tessellation of triangles, said triangles comprising vertices and edges, said system comprising:

a subsystem for dividing at least one triangle in the mesh, but not all triangles in the mesh, into at least two or more triangles apiece, wherein said subsystem for dividing at least one triangle in the mesh comprises a subsystem for dividing at least one edge and creating at least one new vertex and at least one new edge running from said vertex;

a subsystem for sampling a PRT vector at each vertex and each midpoint of each edge;

a subsystem for computing an error at each midpoint at each edge based on the PRT vector for each said midpoint and the PRT vectors for each vertex corresponding to each said edge; and a subsystem for dividing a marked edge, that is, an edge having an error at its midpoint that is greater than a predetermined error tolerance value, into two new edges with a new vertex at the midpoint for said edge (each a "divided edge"); and a subsystem for creating a new edge between said new vertex and a vertex not on said edge, such that said edge is common to said two new triangles (each a "common edge").

9. The system of claim 8 further comprising, for each new edge, including divided edges and common edges, a subsystem for recursively performing the following steps for each such new edge created (herein below, each an "edge"):

sampling a PRT vector each midpoint of each edge, and computing an error at each midpoint at each edge based on the PRT vector for each said midpoint and the PRT vectors for each vertex corresponding to each said edge; and for each edge having an error at its midpoint that is greater than the predetermined error tolerance value (a "marked edge"), dividing the triangle for that edge into at least two new triangles as follows:

dividing the marked edge into two new edges with a new vertex at the midpoint for said edge (each a "divided edge"); and creating a new edge between said new vertex and a vertex not on said edge, such that said edge is common to said two new triangles (each a "common edge");

said step recursively performed until either (a) no new edges are created in preceding recursive iteration or (b) a predetermined number of recursions have been performed.

10. The system of claim 9 wherein a triangle, consisting of one edge having an error at its midpoint that is greater than the predetermined error tolerance value, is divided into at least two new triangles.

11. The system of claim 9 wherein a triangle, consisting of two edges having errors at the midpoints thereof greater than the predetermined error tolerance value, is divided into three new triangles.

12. The system of claim 9 wherein a triangle, consisting of three edges having errors at the midpoints thereof greater than the predetermined error tolerance value, is divided into four new triangles.

13. A system for enhancing a Precomputed Radiance Transfer (PRT) mesh comprising a tessellation of triangles, said triangles comprising vertices and edges, said system comprising:

a subsystem for dividing at least one triangle in the mesh, but not all triangles in the mesh, into at least two or more triangles apiece, wherein said subsystem for dividing at least one triangle in the mesh comprises a subsystem for dividing at least one edge and creating at least one new vertex and at least one new edge running from said vertex;

a subsystem for sampling a PRT vector at each vertex and each midpoint of each edge;

a subsystem for computing an error at each midpoint at each edge based on the PRT vector for each said midpoint and the PRT vectors for each vertex corresponding to each said edge; and a subsystem for dividing each triangle comprising at least one edge having an error at its midpoint that is greater than a predetermined error tolerance value into four new triangles as follows:

dividing each edge into two new edges with a new vertex at the midpoint for said such edge (each a "divided edge"); and creating new edges between each pairs of new vertices (each a "common edge").

14. The system of claim 13 further comprising a new subsystem that, for each new edge, including divided edges and common edges, recursively performs the following steps for each such new edge created (herein below, each an "edge"):

sampling a PRT vector at each edge, and computing an error at each midpoint at each edge based on the PRT vector for each said midpoint and the PRT vectors for each vertex corresponding to each said edge; and for each triangle comprising at least one edge having an error at its midpoint that is greater than a predetermined error tolerance value, dividing said triangle into four new triangles as follows:

dividing each edge into two new edges with a new vertex at the midpoint for said such edge; and creating new edges between each pairs of new vertices; said steps recursively performed until either (a) no new edges are created in preceding recursive iteration or (b) a predetermined number of recursions have been performed.

15. A computer-storage medium encoded with computer-storage instructions for enhancing a Precomputed Radiance Transfer (PRT) mesh comprising a tessellation of triangles, said triangles comprising vertices and edges, said computer-readable instructions comprising instructions for:

dividing at least one triangle in the mesh, but not all triangles in the mesh, into at least two or more triangles apiece, wherein said instructions for dividing at least one triangle in the mesh comprise instructions for dividing at least one edge and creating at least one new vertex and at least one new edge running from said vertex for a triangle;

sampling a PRT vector at each vertex and each midpoint of each edge, and computing an error at each midpoint at each edge based on the PRT vector for each said midpoint and the PRT vectors for each vertex corresponding to each said edge; and for each edge having an error at its midpoint that is greater than a predetermined error tolerance value (a "marked edge"), dividing the triangle for that edge into at least two new triangles as follows:

dividing the marked edge into two new edges with a new vertex at the midpoint for said edge (each a "divided edge"); and creating a new edge between said new vertex and a vertex not on said edge, such that said edge is common to said two new triangles (each a "common edge").

16. The computer-storage medium of claim 15 further comprising instructions for recursively performing the following steps for each new edge, including divided edges and common edges (herein below, each an "edge"):

sampling a PRT vector each midpoint of each edge, and computing an error at each midpoint at each edge based on the PRT vector for each said midpoint and the PRT vectors for each vertex corresponding to each said edge; and for each edge having an error at its midpoint that is greater than the predetermined error tolerance value (a "marked edge"), dividing the triangle for that edge into at least two new triangles as follows:

dividing the marked edge into two new edges with a new vertex at the midpoint for said edge (each a "divided edge"); and creating a new edge between said new vertex and a vertex not on said edge, such that said edge is common to said two new triangles (each a "common edge");

said step recursively performed until either (a) no new edges are created in preceding recursive iteration or (b) a predetermined number of recursions have been performed.

17. The computer-storage medium of claim 16 further comprising instructions for dividing a triangle into at least two new triangles when said triangle consists of one edge having an error at its midpoint that is greater than the predetermined error tolerance value.

18. The computer-storage medium of claim 16 further comprising instructions for dividing a triangle into three new triangles when said triangle consists of two edges having errors at midpoints that are greater than the predetermined error tolerance value.

19. The computer-storage medium of claim 16 further comprising instructions for dividing a triangle into four new triangles when said triangle consists of three edges having errors at midpoints that are greater than the predetermined error tolerance value.

20. A computer-storage medium encoded with computer-storage instructions for enhancing a Precomputed Radiance Transfer (PRT) mesh comprising a tessellation of triangles, said triangles comprising vertices and edges, said computer-readable instructions comprising instructions for:

dividing at least one triangle in the mesh, but not all triangles in the mesh, into at least two or more triangles apiece, wherein said instructions for dividing at least one triangle in the mesh comprise instructions for dividing at least one edge and creating at least one new vertex and at least one new edge running from said vertex for a triangle;

sampling a PRT vector at each vertex and each midpoint of each edge, and computing an error at each midpoint at each edge based on the PRT vector for each said midpoint and the PRT vectors for each vertex corresponding to each said edge; and for each triangle comprising at least one edge having an error at its midpoint that is greater than a predetermined error tolerance value (a "marked edge"), dividing said triangle into four new triangles as follows:

dividing each edge of said triangle into two new edges with a new vertex at the midpoint for said such edge (each a "divided edge"); and creating new edges between each pair of new vertices (each a "common edge").

21. The computer-storage medium of claim 20 further comprising instructions for recursively performing the following steps for each new edge created, including divided edges and common edges (herein below, each an "edge"):
sampling a PRT vector at each edge, and computing an error at each midpoint at each edge based on the PRT vector for each said midpoint and the PRT vectors for each vertex corresponding to each said edge; and
for each triangle comprising at least one edge having an error at its midpoint that is greater than a predetermined error tolerance value, dividing said triangle into four new triangles as follows:
dividing each edge into two new edges with a new vertex at the midpoint for said such edge; and
creating new edges between each pairs of new vertices;
said steps recursively performed until either (a) no new edges are created in preceding recursive iteration or (b) a predetermined number of recursions have been performed.

22. A hardware control device comprising means for:
enhancing a Precomputed Radiance Transfer (PRT) mesh comprising a tessellation of triangles, said triangles comprising vertices and edges, said means for enhancing a Precomputed Radiance Transfer (PRT) mesh including computer-readable instructions comprising instructions for dividing at least one triangle in the mesh, but not all triangles in the mesh, into at least two or more triangles apiece by dividing at least one edge and creating at least one new vertex and at least one new edge running from said vertex;
sampling a PRT vector at each vertex and each midpoint of each edge, and computing an error at each midpoint at each edge based on the PRT vector for each said midpoint and the PRT vectors for each vertex corresponding to each said edge; and
for each edge having an error at its midpoint that is greater than a predetermined error tolerance value (a "marked edge"), dividing the triangle for that edge into at least two new triangles as follows:
dividing the marked edge into two new edges with a new vertex at the midpoint for said edge (each a "divided edge"); and
creating a new edge between said new vertex and a vertex not on said edge, such that said edge is common to said two new triangles (each a "common edge").

23. The hardware control device of claim 22 further comprising means for recursively performing the following steps for each new edge, including divided edges and common edges (herein below, each an "edge"):
sampling a PRT vector each midpoint of each edge, and computing an error at each midpoint at each edge based on the PRT vector for each said midpoint and the PRT vectors for each vertex corresponding to each said edge; and
for each edge having an error at its midpoint that is greater than the predetermined error tolerance value (a "marked edge"), dividing the triangle for that edge into at least two new triangles as follows:
dividing the marked edge into two new edges with a new vertex at the midpoint for said edge (each a "divided edge"); and
creating a new edge between said new vertex and a vertex not on said edge, such that said edge is common to said two new triangles (each a "common edge");
said step recursively performed until either (a) no new edges are created in preceding recursive iteration or (b) a predetermined number of recursions have been performed.

24. A hardware control device comprising means for:
enhancing a Precomputed Radiance Transfer (PRT) mesh comprising a tessellation of triangles, said triangles comprising vertices and edges, said means for enhancing a Precomputed Radiance Transfer (PRT) mesh including computer-readable instructions comprising instructions for dividing at least one triangle in the mesh, but not all triangles in the mesh, into at least two or more triangles apiece by dividing at least one edge and creating at least one new vertex and at least one new edge running from said vertex;
sampling a PRT vector at each vertex and each midpoint of each edge, and computing an error at each midpoint at each edge based on the PRT vector for each said midpoint and the PRT vectors for each vertex corresponding to each said edge; and
for each triangle comprising at least one edge having an error at its midpoint that is greater than a predetermined error tolerance value (a "marked edge"), dividing said triangle into four new triangles as follows:
dividing each edge of said triangle into two new edges with a new vertex at the midpoint for said such edge (each a "divided edge"); and
creating new edges between each pair of new vertices (each a "common edge").

25. The hardware control device of claim 24 further comprising means for recursively performing the following steps for each new edge created, including divided edges and common edges (herein below, each an "edge"):
sampling a PRT vector at each edge, and computing an error at each midpoint at each edge based on the PRT vector for each said midpoint and the PRT vectors for each vertex corresponding to each said edge; and
for each triangle comprising at least one edge having an error at its midpoint that is greater than a predetermined error tolerance value, dividing said triangle into four new triangles as follows:
dividing each edge into two new edges with a new vertex at the midpoint for said such edge; and
creating new edges between each pairs of new vertices;
said steps recursively performed until either (a) no new edges are created in preceding recursive iteration or (b) a predetermined number of recursions have been performed.

* * * * *